Feb. 20, 1923. 1,446,258
J. D. P. LEWIS
PRIMER FOR GAS ENGINES
Filed Jan. 19, 1920
*Fig. 1.*
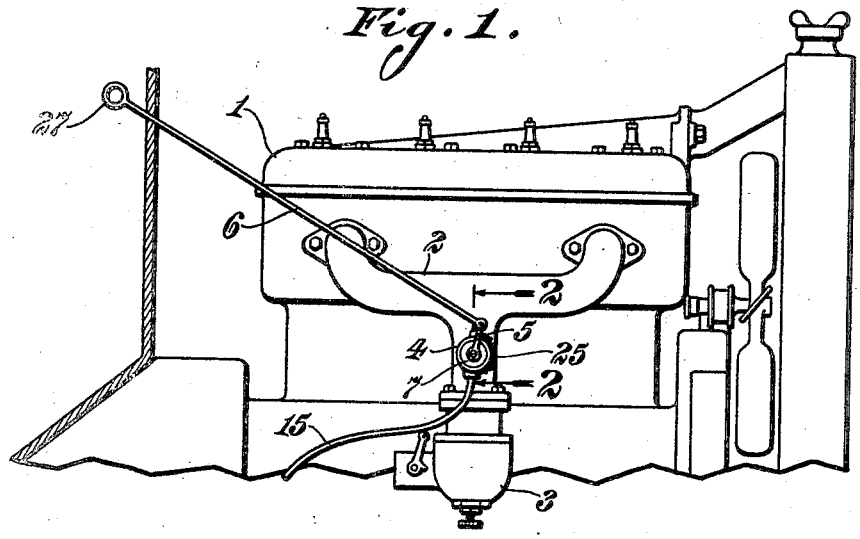
*Fig. 2.*
*Fig. 3.*
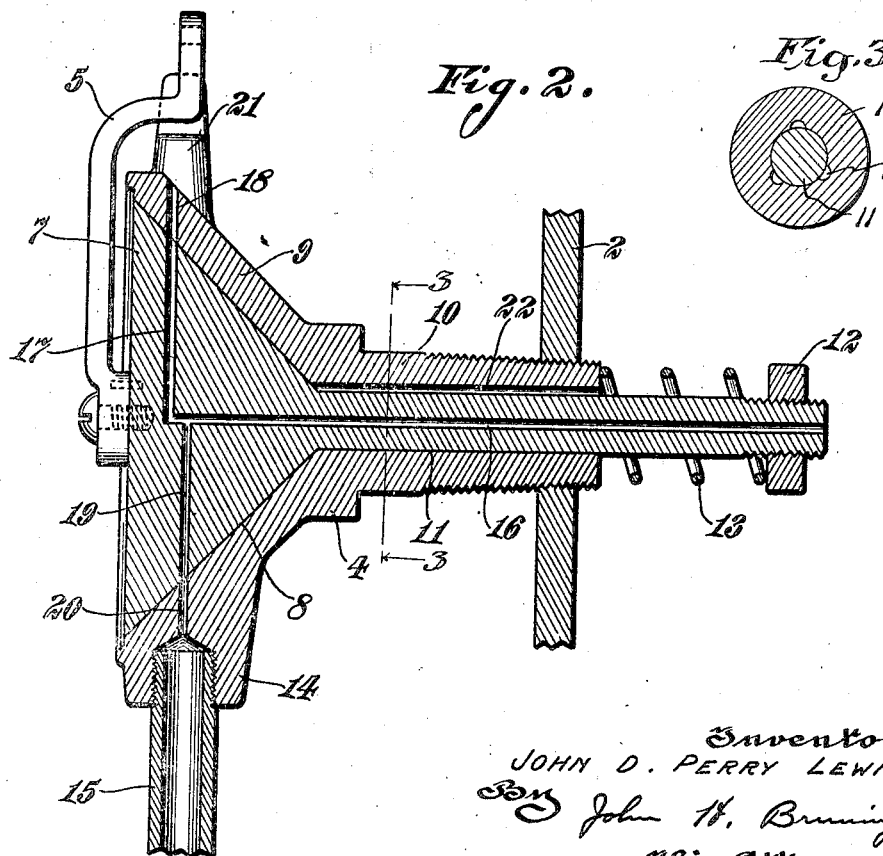
Inventor:
JOHN D. PERRY LEWIS,
By John H. Bruninga
His Attorney.

Patented Feb. 20, 1923.

1,446,258

UNITED STATES PATENT OFFICE.

JOHN D. PERRY LEWIS, OF ST. LOUIS, MISSOURI.

PRIMER FOR GAS ENGINES.

Application filed January 19, 1920. Serial No. 352,604.

*To all whom it may concern:*

Be it known that I, JOHN D. PERRY LEWIS, a citizen of the United States, and residing at St. Louis, Missouri, have invented the new and useful Improvement in Primers for Gas Engines, of which the following is a specification.

This invention relates to primers for internal combustion engines, and more particularly for automobile engines.

In primer valves of the usual construction, a great deal of trouble is experienced from leakage with consequent waste of fuel and uncertainty of action of the primer when in use. Furthermore when the primer is shut off during the normal operation of the engine, the leakage of air and also of fuel past the valve is liable to cause irregular action of the engine.

One of the objects of this invention, therefore, is to provide a primer which shall be free from leakage either when in use or during the normal operation when shut off.

Further objects will appear from the detail description taken in connection with the accompanying drawing, in which:

Figure 1 is a general view of an automobile engine equipped with a primer embodying this invention; and, Figure 2 is an enlarged sectional view taken on the line 2—2, Figure 1.

Figure 3 is a section on the line 3—3, Figure 2.

Referring now to the accompanying drawing, 1 designates an automobile engine of any usual type and construction having an intake manifold 2, and a carburetor 3. Mounted on the wall of the intake manifold 2 is a primer 4 having an operating arm 5 connected by means of a rod 6 to the dash of the automobile or any other convenient point for manipulation.

The primer 4 comprises a valve head 7 having a conical seat 8 adapted for engagement with a similar seat on the valve casing 9. The valve casing is also of conical form and has formed thereon adjacent the apex of the cone, an extension 10 externally threaded for attachment to the manifold 2. The extension 10 is hollow and is adapted to receive a similar stem 11 formed on the valve head 7, the stem extending through and projecting beyond the extension, and having its end threaded to receive a nut 12 adapted for engagement with a spring 13 which bears, at one end, against the nut 12, and at the other end against the face of the extension 10, so as to hold the valve head 7 in its seat with a yielding pressure.

The valve casing is further equipped with an extension lug 14 internally threaded to receive the fuel supply pipe 15. The valve stem is provided with a central duct 16 extending from the rear end of the stem to within a short distance of the front face of the valve head. Communicating with the duct 16 is an upwardly extending air duct 17 adjacent the front face of the valve head and adapted to register with a similar duct 18 extending through the valve casing for communication with the external atmosphere. Another downwardly extending duct 19, slightly larger than the duct 17 and also adjacent the front face of the valve head and communicating with the duct 16 is adapted to register with a duct 20 communicating with the supply pipe 15. The operating arm 5 is rigidly attached to the front face of the valve head. By swinging the arm 5, the valve body may be rotated so as to place the ducts 17 and 19 out of registry with the ducts 18 and 20 respectively, and thereby close the valve. A lug 21 limits the movement of the arm 5 to insure proper registry of the ducts when the valve is open.

In operation, when the valve is opened, by turning the head so as to place the ducts 17 and 19 into registry with the ducts 18 and 20 respectively, the reduced pressure in the manifold 2 will cause suction through the duct 16 which will draw in air through the ducts 18 and 17 and fuel through the ducts 20 and 19 supplying thereby a rich mixture to the engine. By making the diameter of the duct 19 larger or smaller as compared with that of the duct 17 the richness of the mixture delivered to the engine may be varied or adjusted to suit any requirements. The arm 5 is connected by a spring 25 with the lug 26 on the casing, and this spring operates to normally hold the valve closed, the movement being limited by the head 27 on the rod 6 striking against the dash. Accordingly, when the valve is opened against the tension of the spring, the release of the head 27 will cause the spring to automatically return the parts to normal position with the primer shut off, which is the normal condition during the normal operation of the engine.

The extension 10 of the valve casing is provided with a series of grooves or ducts 22 adapted to connect the space between the valve casing and the head 9 with the interior of the intake manifold 2. The object of this duct is to cause the reduced pressure in the manifold to reduce the pressure in said duct, tending to exhaust any gas or other fluid from between the surface of the valve casing and its head 9, in order that the atmospheric pressure, acting on the enlarged front face of the valve head, may be effective in forcing said body against its seat to make a tight joint and prevent leakage. Another effect of applying suction to the duct 22 is to cause a fall of pressure along the space between the valve head and its seat from the enlarged portion toward the small portion thereof. This has the further effect of causing any leakage of fuel which may have been retained in the duct 19 upon closing the valve, to take place toward the reduced portion of the valve and, therefore, toward the reduced portion of the valve and, therefore, toward the manifold 2. It is evident that this will result in economy of fuel, and also prevent leakage toward the outside of the valve.

It is obvious that various changes may be made in the details of construction without departing from the spirit of this invention; it is therefore, to be understood that this invention is not to be limited to the specific construction shown and described.

Having thus described this invention, what is claimed is:

1. A primer for an internal combustion engine having an intake under reduced pressure, comprising, a valve casing, a fuel connection thereto, a valve head adapted to seat in said casing, and means for connecting the space between said casing and said head with said intake, adapted to reduce the fluid pressure in said space and hold said head on its seat by fluid pressure on said head.

2. A primer for an internal combustion engine having an intake under reduced pressure, comprising, a valve casing, a connection thereto, a valve head adapted to seat in said casing, and means for connecting the space between said casing and said head with said intake, adapted to reduce the fluid pressure in said space and hold said head on its seat by atmospheric pressure on said head.

3. A primer for an internal combustion engine having an intake under reduced pressure, comprising, a valve casing, a connection thereto, a valve head adapted to seat in said casing, and a duct connecting the space between said casing and said head with said intake, adapted to reduce the fluid pressure in said space and hold said head on its seat by fluid pressure on said head.

4. A primer for an internal combustion engine comprising, a flared valve casing, a connection thereto, a valve head adapted to seat in said casing, a fluid duct traversing the enlarged portion of said casing and said head, means for interrupting said duct, and means for reducing the fluid pressure between said casing and said head adapted to prevent leakage from said duct.

5. A primer for an internal combustion engine, comprising, a flared valve casing, a connection thereto, a valve head adapted to seat in said casing, a fluid duct traversing the enlarged portion of said casing and said head, means for rotating said head to interrupt said duct, and means for reducing the fluid pressure between said casing and said head adapted to prevent leakage from said duct.

6. A primer for an internal combustion engine, comprising, a flared valve casing, a connection thereto, a valve head adapted to seat said casing, a fluid duct traversing the enlarged portion of said head and said casing, means for interrupting said duct, and means for causing a fall of fluid pressure in the space between said casing and said head from the enlarged toward the reduced portion thereof, adapted to prevent leakage from said duct.

7. A primer for an internal combustion engine, comprising, a flared valve casing, a connection thereto, a valve head adapted to seat in said casing a fluid duct traversing the enlarged portion of said casing and said head, means for interrupting said duct, and means for causing a fall of fluid pressure in the space between said casing and said head from the enlarged toward the reduced portion thereof, adapted to prevent leakage from said duct toward said enlarged portion.

8. A primer for an internal combustion engine, comprising, a conical valve casing, a connection thereto, a valve head adapted to seat in said casing fluid ducts traversing the enlarged portion of said casing and said head, means for rotating said head to interrupt said duct, and means for preventing leakage from said duct.

9. A primer for an internal combustion engine, comprising, a valve casing having a conical seat and having a tubular extension adapted for connection to the engine intake, a connection to said casing, a valve having a head engaging said seat and a stem passing through said tubular extension, and a spring for holding said head on said seat, said head and casing having cooperating air and fuel ducts, and said stem having a duct into which said air and fuel ducts discharge.

In testimony whereof I affix my signature this 28th day of November, 1919.

JOHN D. PERRY LEWIS.